(12) United States Patent
Zheng et al.

(10) Patent No.: US 10,812,984 B2
(45) Date of Patent: Oct. 20, 2020

(54) DEVICES, METHODS, AND SYSTEMS WITH DYNAMIC SPECTRUM SHARING

(71) Applicant: ATC Technologies, LLC, Reston, VA (US)

(72) Inventors: Dunmin Zheng, Vienna, VA (US); Santanu Dutta, Vienna, VA (US)

(73) Assignee: ATC TECHNOLOGIES, LLC, Reston, VA (US)

( * ) Notice: Subject to any disclaimer, the term of this patent is extended or adjusted under 35 U.S.C. 154(b) by 0 days.

(21) Appl. No.: 15/997,603

(22) Filed: Jun. 4, 2018

(65) Prior Publication Data

US 2018/0352441 A1     Dec. 6, 2018

Related U.S. Application Data

(60) Provisional application No. 62/514,518, filed on Jun. 2, 2017.

(51) Int. Cl.

| | |
|---|---|
| *H04W 16/14* | (2009.01) |
| *H04W 28/04* | (2009.01) |
| *H04B 1/00* | (2006.01) |
| *H04W 72/02* | (2009.01) |
| *H04L 12/721* | (2013.01) |

(52) U.S. Cl.
CPC .......... *H04W 16/14* (2013.01); *H04B 1/0003* (2013.01); *H04W 28/04* (2013.01); *H04W 72/02* (2013.01); *H04L 45/32* (2013.01)

(58) Field of Classification Search
CPC ... H04W 72/02; H04W 16/14; H04W 1/0003; H04W 28/04; H04L 45/32; H04B 1/00

USPC ......................................................... 370/329
See application file for complete search history.

(56) References Cited

U.S. PATENT DOCUMENTS

| | | | |
|---|---|---|---|
| 7,570,628 B2 * | 8/2009 | Rangarajan | ............. H04L 45/00 370/351 |
| 7,733,809 B2 * | 6/2010 | Lee | .......................... H04L 12/66 370/256 |

(Continued)

OTHER PUBLICATIONS

International Search Report and Written Opinion for Application No. PCT/US18/35908 dated Aug. 28, 2018 (17 pages).

*Primary Examiner* — Man U Phan
(74) *Attorney, Agent, or Firm* — Michael Best & Friedrich LLP

(57) ABSTRACT

Devices, methods, and systems with dynamic spectrum sharing. In one embodiment, a wireless communication device includes a software-defined radio, a spectrum sensing sub-system, a memory, and an electronic processor. The software-defined radio is configured to generate an input signal, and wirelessly communicate with one or more radio nodes using a traffic data channel and a broadcast control channel. The spectrum sensing sub-system is configured to sense local spectrum information from the input signal. The electronic processor is communicatively connected to the memory and the spectrum sensing sub-system and is configured to receive the local spectrum information from the spectrum sensing sub-system, receive spectrum information from the one or more radio nodes, and allocate resources for the traffic data channel based on the local spectrum information and the spectrum information that is received from the one or more radio nodes.

14 Claims, 8 Drawing Sheets

(56) References Cited

U.S. PATENT DOCUMENTS

| | | | | |
|---|---|---|---|---|
| 7,792,533 | B2* | 9/2010 | Grandblaise | H04W 16/06 |
| | | | | 455/450 |
| 7,876,709 | B2* | 1/2011 | Schilling | H04W 8/082 |
| | | | | 370/254 |
| 9,357,399 | B2* | 5/2016 | Kwon | H04W 24/02 |
| 9,565,620 | B2* | 2/2017 | Dukes | H04W 40/246 |
| 9,599,699 | B2* | 3/2017 | Zeng | G01S 5/14 |
| 9,756,529 | B2* | 9/2017 | Buddhikot | H04W 16/14 |
| 10,165,450 | B2* | 12/2018 | Taher | H04W 16/14 |
| 10,187,805 | B2* | 1/2019 | Zhou | H04W 16/14 |
| 2002/0160781 | A1* | 10/2002 | Bark | H04W 52/325 |
| | | | | 455/450 |
| 2004/0010592 | A1* | 1/2004 | Carver | H04L 47/70 |
| | | | | 709/226 |
| 2006/0160543 | A1* | 7/2006 | Mashinsky | H04W 16/10 |
| | | | | 455/452.2 |
| 2007/0091871 | A1* | 4/2007 | Taha | H04L 49/3009 |
| | | | | 370/352 |
| 2008/0101284 | A1 | 5/2008 | Buchwald et al. | |
| 2009/0252178 | A1 | 10/2009 | Huttunen et al. | |
| 2010/0173586 | A1 | 7/2010 | McHenry et al. | |
| 2013/0231121 | A1 | 9/2013 | Vrzic et al. | |
| 2015/0003238 | A1* | 1/2015 | Kalmikov | H04W 28/0289 |
| | | | | 370/230 |
| 2016/0119899 | A1 | 4/2016 | Freda et al. | |
| 2018/0220305 | A1* | 8/2018 | Lei | H04L 5/0053 |
| 2019/0165827 | A1* | 5/2019 | Churan | H04B 1/707 |

\* cited by examiner

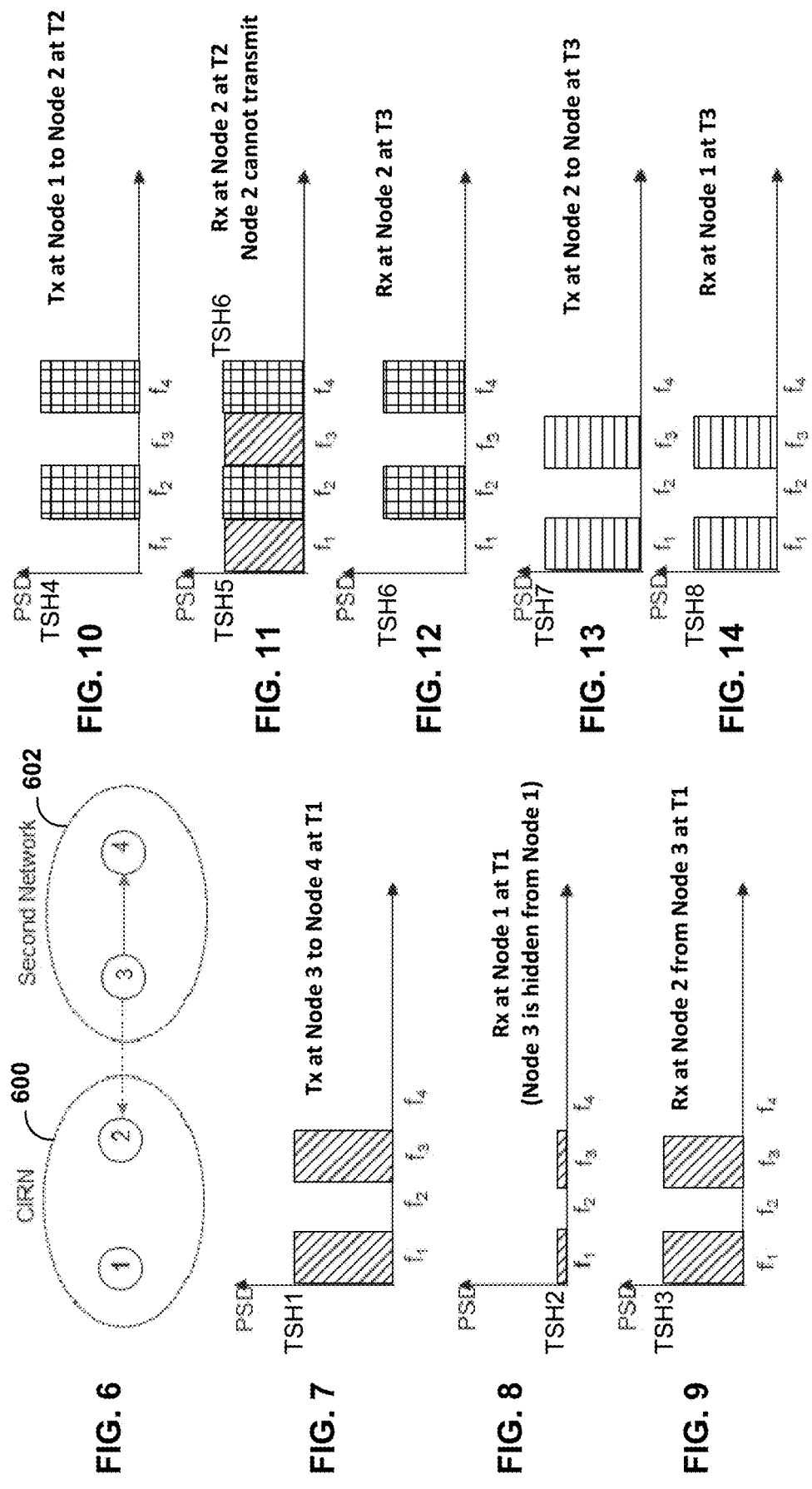

DEVICES, METHODS, AND SYSTEMS WITH DYNAMIC SPECTRUM SHARING

CROSS-REFERENCE TO RELATED APPLICATION

This application claims the benefit of U.S. Provisional Patent Application No. 62/514,518 filed on Jun. 2, 2017, the entire content of which is hereby incorporated by reference.

FIELD OF THE INVENTION

The present disclosure relates generally to wireless communication systems. More specifically, the present disclosure relates to devices, methods, and systems with dynamic spectrum sharing ("DSS").

BACKGROUND

In node to node (or point to point) communications for a wireless network, a control channel is used to establish a data link from node A to node B. The control channel includes information indicative of resource allocation, transport format, and other explicit information about the downlink ("DL") transmission.

Conventionally, in wireless communication systems with exclusive spectrum usage, a known fixed frequency and time slots are allocated for the control channel. The protocols of conventional wireless communication systems are designed based on an assumption that the fixed frequency/time resources are available all the time.

SUMMARY

Devices, methods, and systems of the present disclosure are not limited by exclusive spectrum usage. Instead, the devices, methods, and systems of the present disclosure use dynamic spectrum sharing. By using dynamic spectrum sharing, the devices, methods, and systems of the present disclosure are not guaranteed fixed bandwidth or spectrum because available spectrum is shared dynamically among intra-network nodes and/or inter-network nodes.

To establish a control channel between a source node and a destination node in a DSS communication system requires a control channel that is different than the control channel that is used to establish the data link from node A to node B in a conventional wireless communication system. The present disclosure provides a control channel for a multi-node collaborative intelligent radio network (referred to herein as "broadcast control channel").

For example, in one embodiment, the present disclosure includes a wireless communication device. The wireless communication system includes a software-defined radio, a spectrum sensing sub-system, a memory, and an electronic processor. The software-defined radio is configured to generate an input signal, and wirelessly communicate with one or more radio nodes using a traffic data channel and a broadcast control channel. The spectrum sensing sub-system is configured to sense local spectrum information from the input signal. The electronic processor is communicatively connected to the memory and the spectrum sensing sub-system and is configured to receive the local spectrum information from the spectrum sensing sub-system, receive spectrum information from the one or more radio nodes, and allocate resources for the traffic data channel based on the local spectrum information and the spectrum information that is received from the one or more radio nodes.

In another embodiment, the present disclosure includes a dynamic spectrum sharing method. The method includes receiving, with an electronic processor, local spectrum information from a spectrum sensing sub-system, receiving, with the electronic processor, spectrum information from one or more radio nodes, and allocating, with the electronic processor, resources for a traffic data channel based at least in part on the local spectrum information and the spectrum information that is received from the one or more radio nodes.

In another embodiment, the present disclosure includes a wireless communication system including a plurality of radio nodes forming a wireless network. At least two of the plurality of radio nodes includes a software-defined radio, a spectrum sensing sub-system, a memory, and an electronic processor. The software-defined radio is configured to generate an input signal, and wirelessly communicate with one or more radio nodes using a traffic data channel and a broadcast control channel. The spectrum sensing sub-system is configured to sense local spectrum information from the input signal. The electronic processor is communicatively connected to the memory and the spectrum sensing sub-system and is configured to receive the local spectrum information from the spectrum sensing sub-system, receive spectrum information from the one or more radio nodes, and allocate resources for the traffic data channel based on the local spectrum information and the spectrum information that is received from the one or more radio nodes.

In yet another embodiment, the present disclosure includes another dynamic spectrum sharing method. The method includes generating spectrum information at each radio node of a plurality of radio nodes forming a wireless network, broadcasting the spectrum information that is generated by the each radio node of the plurality of radio nodes over a broadcast control channel, receiving the spectrum information that is broadcast over the broadcast control channel at the each radio node of the plurality of radio nodes, and allocating resources for a traffic data channel at the each radio node of the plurality of radio nodes based at least in part on the spectrum information that is received.

BRIEF DESCRIPTION OF THE DRAWINGS

FIGS. 6-14 are diagrams illustrating an example of broadcasting spectrum information between a CIRN and another wireless communication network.

DETAILED DESCRIPTION OF EXEMPLARY EMBODIMENTS

Before any embodiments of the present disclosure are explained in detail, it is to be understood that the present disclosure is not limited in its application to the details of construction and the arrangement of components set forth in the following description or illustrated in the following drawings. The present disclosure is capable of other embodiments and of being practiced or of being carried out in various ways.

Unlike a conventional control channel, the systems and methods of the present disclosure use a control channel in order to make broadcast control channel feasible and reliable in dynamic spectrum sharing, reduce the overhead and resource requirement for control channel, broadcast spectrum sensing at each node to facilitate multi-node intelligent spectrum sharing collaboration, and enable both centralized and decentralized intelligent spectrum sharing, which is suitable for wireless mesh network. The broadcast control channel is a low data rate channel based on direct sequence spread spectrum (DSSS) or spread spectrum/frequency hopping (FH/SS) over the entire network bandwidth or partial network bandwidth.

Figure 1:
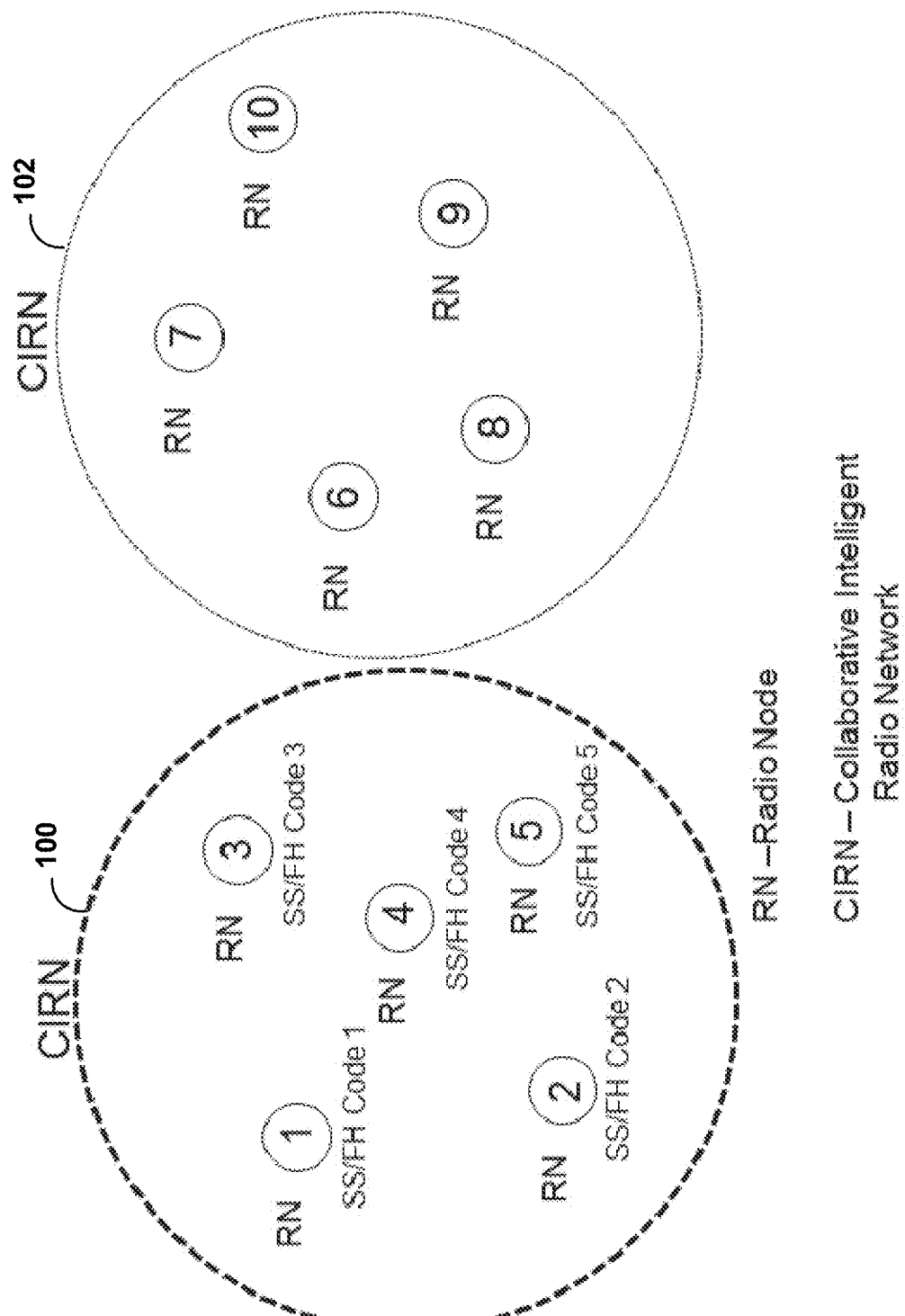
FIG. 1 is a diagram illustrating two collaborative intelligent radio networks (CIRNs), each of the CIRNs including a plurality of radio nodes.

FIG. 1 is a diagram illustrating two collaborative intelligent radio networks (CIRNs) 100 and 102. In the example of FIG. 1, collaborative intelligent radio network (CIRN) 100 includes five radio nodes, for example, radio node (RN) 1, radio node 2, radio node 3, radio node 4, and radio node 5. Each identification of the five radio nodes is uniquely tied to a SS/FH code sequence (for example, RN 1 is assigned SS/FH Code 1) among the radio nodes within the CIRN 100 (and in some instances, orthogonal to each other).

Additionally, in the example of FIG. 1, collaborative intelligent radio network (CIRN) 102 includes another five radio nodes, for example, radio node 6, radio node 7, radio node 8, radio node 9, and radio node 10. The CIRN 102 is a completely independent network that is just trying to share the spectrum with CIRN 100. In some embodiments, the CIRN 102 may use the same broadcast control schemas as described with respect to the CIRN 100. In other embodiments, the CIRN 102 may use different broadcast control schemas as described with respect to the CIRN 100.

In the example of FIG. 1, each of the radio nodes 1-5 may use a broadcast control channel as described in greater detail below. In some embodiments, one of the radio nodes 1-5 may be a gateway node that uses a collaboration broadcast channel as described in greater detail below.

Figure 2:
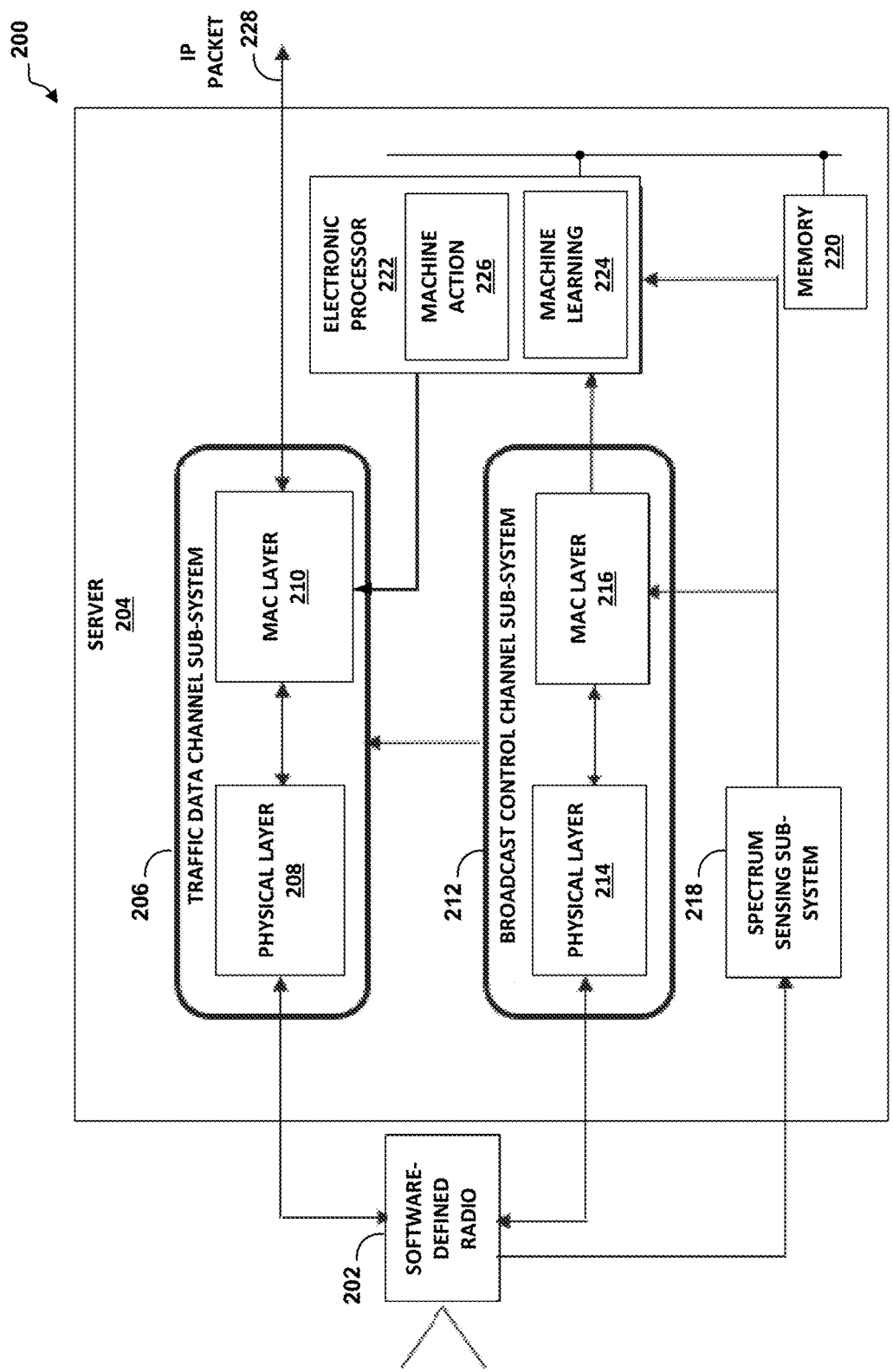
FIG. 2 is a block diagram illustrating a radio node architecture.

FIG. 2 is a block diagram illustrating a radio node architecture 200. In the example of FIG. 2, the radio node architecture 200 includes a software-defined radio (SDR) 202 and a server 204. The server 204 includes a traffic data channel sub-system 206 including a physical layer 208 and a media-access control (MAC) layer 210, a broadcast control channel sub-system 212 including a physical layer 214 and a media-access control (MAC) layer 216, spectrum sensing sub-system 218, a memory 220, and an electronic processor 222 (for example, a microprocessor or another suitable processing device). The memory 220 is a non-transitory computer-readable medium that stores instructions that are executable by the electronic processor 222. The radio node architecture 200 also includes an internet protocol (IP) packet 228. The spectrum sensing sub-system 218 may be implemented in software, hardware, or a combination of software and hardware.

It should be understood that, in some embodiments, the radio node architecture 200 may include fewer or additional components in configurations different from that illustrated in FIG. 2. Also the radio node architecture 200 may perform additional functionality than the functionality described herein. As illustrated in FIG. 2, the memory 220 and the electronic processor 222 are electrically coupled by one or more control or data buses enabling communication between the components.

The memory 220 may include a program storage area (for example, read only memory (ROM)) and a data storage area (for example, random access memory (RAM), and other non-transitory, machine-readable medium). In some examples, the program storage area may store the instructions regarding the machine learning function 224 and the machine action function 226. In some examples, the program storage area may store the instructions to implement the traffic data channel sub-system 206, the broadcast control channel 212, and the spectrum sensing sub-system 218.

The electronic processor 222 executes machine-readable instructions stored in the memory 220. For example, the electronic processor 222 may execute instructions stored in the memory 220 to perform the machine learning functionality described above to decide on machine action 226 regarding an optimal frequency and a time allocation for the traffic data channel 204.

Machine learning generally refers to the ability of a computer program to learn without being explicitly programmed. In some embodiments, a computer program (for example, a learning engine) is configured to construct an algorithm based on inputs. Supervised learning involves presenting a computer program with example inputs and their desired outputs. The computer program is configured to learn a general rule that maps the inputs to the outputs from the training data it receives. Example machine learning engines include decision tree learning, association rule learning, artificial neural networks, classifiers, inductive logic programming, support vector machines, clustering, Bayesian networks, reinforcement learning, representation learning, similarity and metric learning, sparse dictionary learning, and genetic algorithms. Using one or more of the approaches described above, a computer program can ingest, parse, and understand data and progressively refine algorithms for data analytics.

At each radio node, the broadcast control channel sub-system 212 provides spectrum information from all other radio nodes in the same radio network in addition to local spectrum information generated by the spectrum sensing sub-system 218 from processing the input signal provided by the SDR 202. Based on the cooperative spectrum information, the electronic processor 222 uses machine learning 224 to learn and understand the spectrum of the radio network. The electronic processor 222 uses machine action 226 to allocate the frequency and time resource for the traffic data channel 204 including the IP packet 228. The broadcast control channel sub-system 212 also provides the control signal information for the traffic channel (such as frequency/time allocation, modulation and coding scheme, etc.) from the source node by processing the received broadcast control data steam to enable correctly decoding the received traffic data if the node it belongs to is the traffic destination node.

Each radio node has an electronic processor 222 that uses machine learning 224 and machine action 226, and is suitable for decentralized network architecture. Each radio node broadcasts key information among the radio nodes in the radio network that ensures every node has a complete picture of the spectrum situation of the entire radio network.

For centralized network architecture, when hidden radio nodes exist on the same radio network, a given radio node may broadcast not only the power spectrum density (PSD) at the location of the given radio node but rebroadcast, that is relay, the PSD vector received from other radio nodes in listening range (for example, flood routing as described in greater detail below), received in the previous epoch. A single epoch delay in the PSD vector may still preserve most of the value of the PSD vector. However, rebroadcasting the PSD vector received from other radio nodes in listening range may be omitted when hidden radio nodes do not exist on the same radio network.

Each radio node, including a gateway node, has the same ability to perform machine learning. Similarly, each radio node, including a gateway node, has the same ability to perform a machine action. In a centralized network architecture, the machine learning and machine action is performed mainly by the gateway node, whereas in a distributed network architecture, the machine learning and machine action is performed by each radio node.

The distributed network architecture overcomes limitations of the centralized network architecture. For example, the distributed network architecture overcomes the destination node being hidden from the source node by using CIRNs to set up multi-hop relay routes. This provides an intelligent adaptive mesh network capability.

Figure 3:
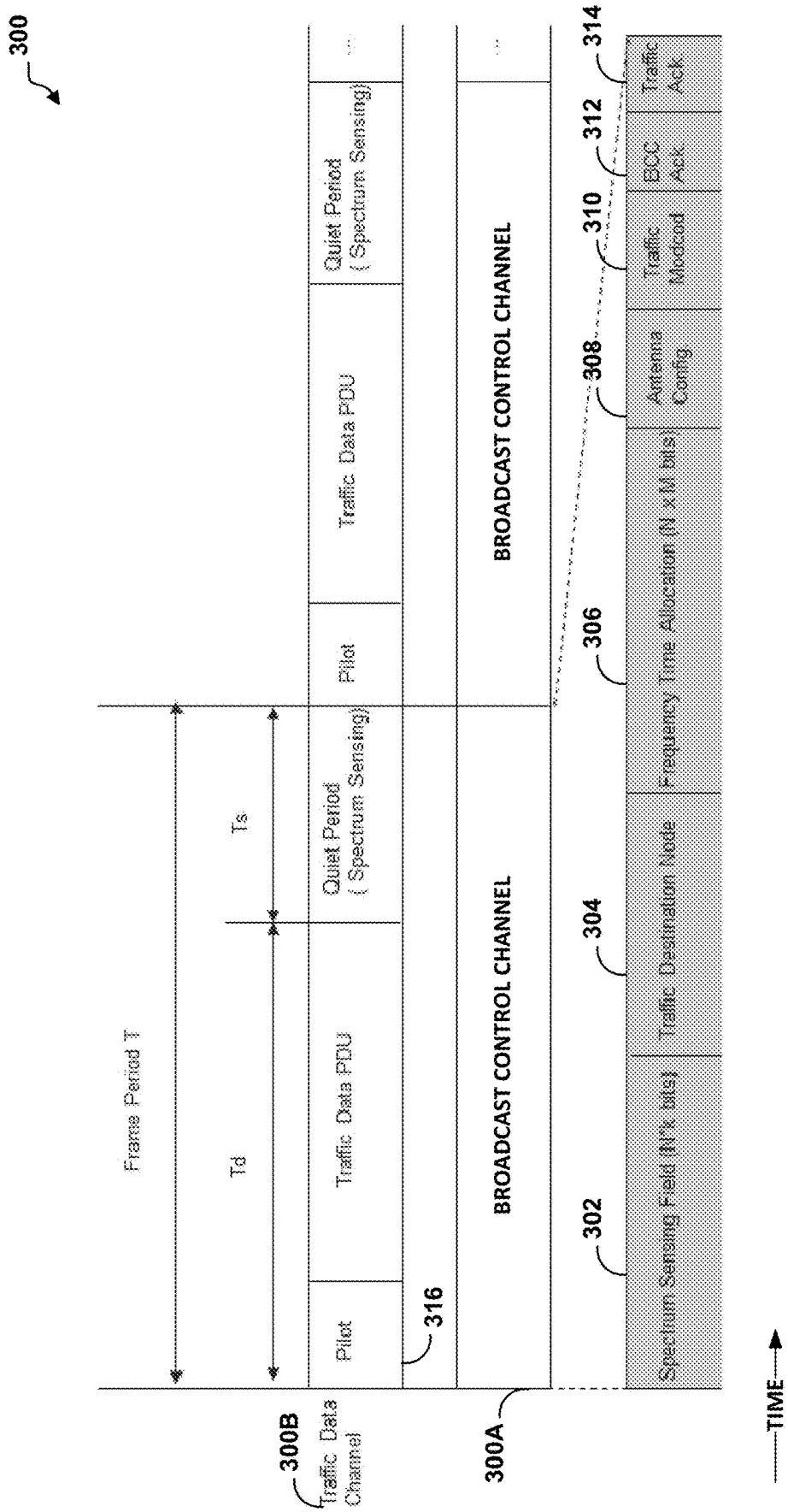
FIG. 3 is a diagram illustrating a frame structure of a broadcast control channel and a traffic data channel.

FIG. 3 is a diagram illustrating a frame structure 300 of a broadcast control channel and a traffic data channel. As illustrated in FIG. 3, the X-axis is time.

In the example of FIG. 3, the broadcast control channel information 300A includes spectrum information 302, traffic destination node 304, frequency time allocation 306, antenna configuration 308, traffic modulation and coding indicator 310, broadcast control channel acknowledgement indicator 312, and traffic acknowledgement indicator 314.

The spectrum information 302 represents available frequency bin. In some embodiments, at the radio node, there is one to three bits per frequency bin which is N to 3*N bits for N frequency bins. For example, when there is one bit per frequency bin, then 1 indicates occupied. In other embodiments, when there is more than one bits (for example, k bits) used per frequency bin, $2^k$ levels of power spectrum density (PSD) can be represented per frequency bin.

Traffic destination node 304 is represented with a destination node ID. In some embodiments, the traffic destination node 304 may be represented by two bits, which accommodates up to four radio nodes.

Frequency time allocation 306 includes resource allocation of traffic channel for the destination node. For example, frequency and time slot allocation for the data traffic, and N×M bits would cover N frequency bins and M time slots.

Antenna configuration 308 is one bit and indicates use of multiple-in and multiple-out (MIMO) configuration between the transmitter and the receiver. Traffic modcode 310 is indicative of the modulation and coding scheme for the traffic channel. In some embodiments, the Traffic modcode 310 is two bits and covers four modulation and coding schemas.

BCC (Broadcast Control Channel) acknowledgement indicator 312 is indicative of successfully decoding the broadcast control channel if the node is a destination node, and ready to receive traffic data. In some embodiments, the BCC acknowledgement indicator 312 may be one bit.

Traffic acknowledgement indicator 314 is indicative of successfully decoding the traffic data channel if the radio node is a destination node. In some embodiments, the traffic data acknowledgement indicator 314 may be one bit.

In some embodiments, the bits of the broadcast control channel information 300A may be coded with forward error correction (FEC) with low order modulation. The forward error correction is followed by direct sequence spread spectrum (DSSS) or frequency hopping spread spectrum (FHSS).

In some embodiments, the traffic data channel 300B uses Orthogonal Frequency Division Multiple Access (OFDMA) with resources allocation by the machine action (for example, machine action 226 as described above in FIG. 2). The broadcast control channel 300A and the traffic data channel 300B are also frame synced under a common time reference.

In the example of FIG. 3, the pilot 316 may be inserted discretely at time and frequency grids for OFDMA data channel. In the example of FIG. 3, the spectrum sensing may be averaged and updated over several frames.

Figure 4:
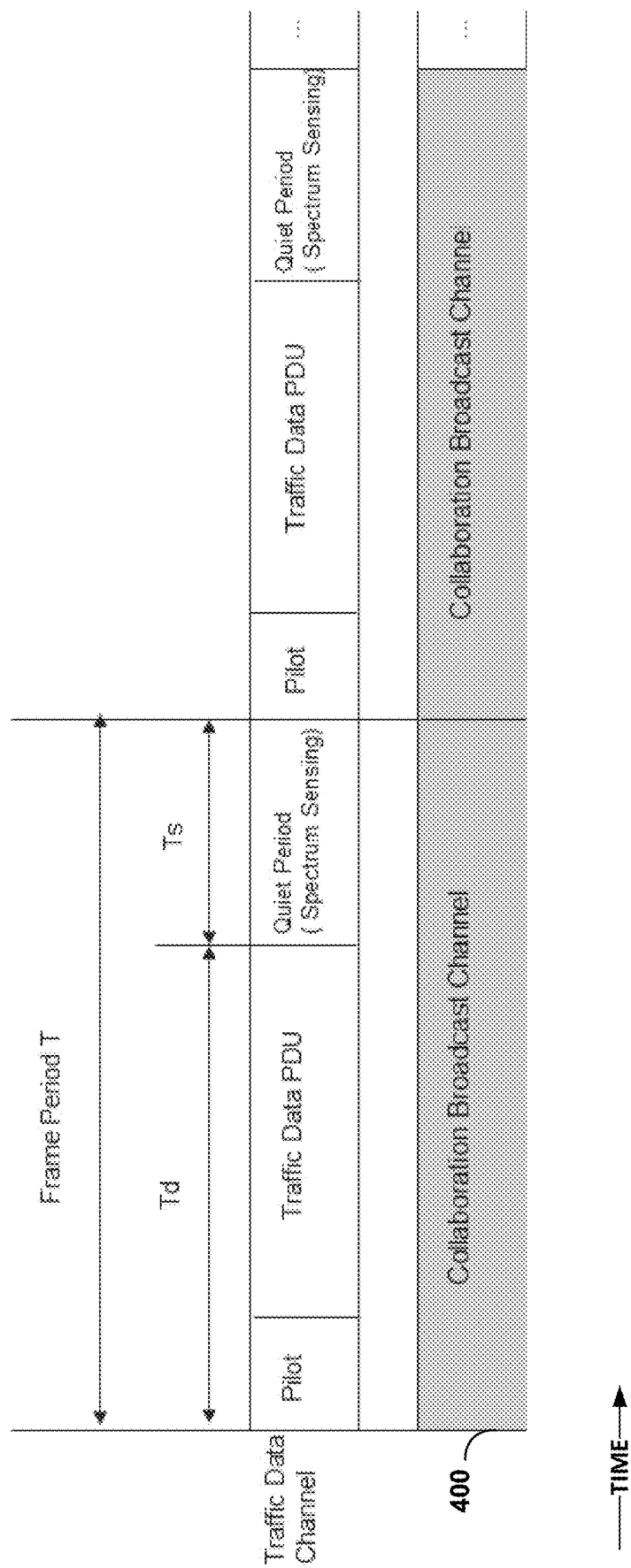
FIG. 4 is a diagram illustrating a collaboration broadcast channel frame structure of a gateway node.

FIG. 4 is a diagram illustrating a collaboration broadcast channel frame structure 400 of a gateway node. As illustrated in FIG. 4, the X-axis is time. In the example of FIG. 4, at a gateway node, there is an additional collaboration broadcast channel 400 for distributed network architecture. The collaboration information to be broadcast is filtered by an electronic processor (for example, the electronic processor 222) at the gateway node.

The unique spreading, or frequency hopping code sequence assigned is tied to the collaboration broadcast channel 400 at the gateway node. In some embodiments, the bits of the collaboration channel information may be coded with forward error correction FEC with low order modulation. The forward error correction is followed by direct sequence spread spectrum or frequency hopping spread spectrum. In some embodiments, the bits of the collaboration channel information may be updated at frame rate.

Figure 5:
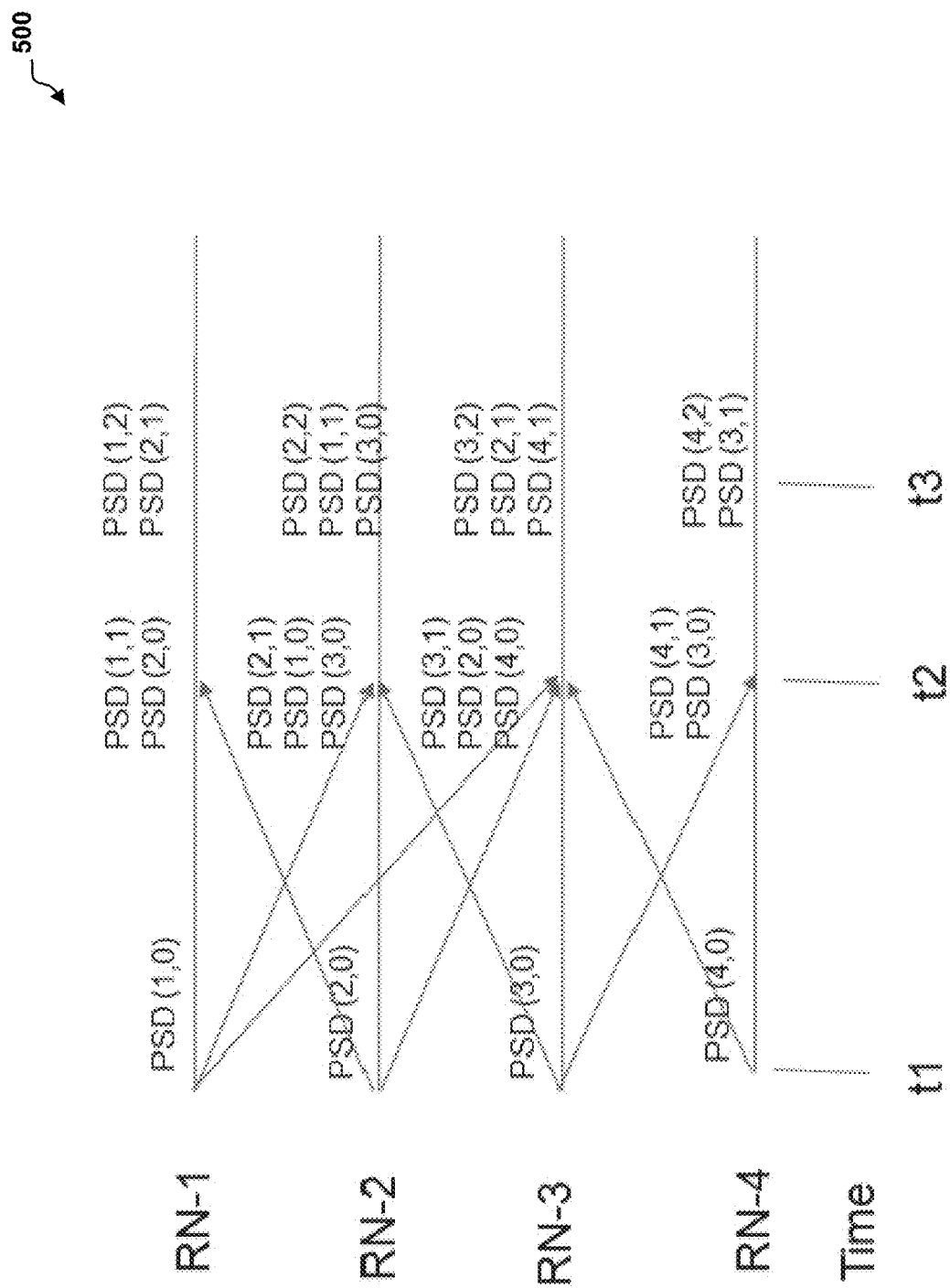
FIG. 5 is a diagram illustrating flood routing of PSD vectors.

FIG. 5 is a diagram illustrating flood routing 500 of power spectrum density (PSD) vectors. Flood routing is a way which in which information may be shared over time across a population of nodes so that, after a period of time, all nodes have the same information. In the example of FIG. 5, the flood routing 500 of PSD vectors causes all radio nodes in the radio network to be aware of PSD vectors at all radio node locations. The flood routing 500 of the PSD vectors is best applied when hidden nodes exist within the same radio network. The flood routing 500 is also well suited to a mesh-relay network.

In the example of FIG. 5, at time T1, the radio nodes 1-4 are each aware of their own PSD vector. At time T2, radio node 1 is aware of its own PSD vector and the PSD vector of the radio node 2. At time T2, radio node 2 is aware of its own PSD vector and the PSD vectors of the radio nodes 1 and 3. At time T2, radio node 3 is aware of its own PSD vector and the PSD vectors of the radio nodes 2 and 4. At time T2, radio node 4 is aware of its own PSD vector and the PSD vector of the radio node 4. The flood routing 500 enables each of the radio nodes to be aware of all PSD vectors.

FIGS. 6-14 are diagrams illustrating an example of broadcasting spectrum information between a CIRN 600 and another wireless communication network 602. In the example of FIG. 6, the CIRN 600 includes radio nodes 1 and 2 and the other wireless communication network 602 includes radio nodes 3 and 4. In the example of FIG. 6, the radio node 3 transmits to radio node 4, and the transmission by the radio node 3 is also received by radio node 2.

FIG. 7 illustrates the transmission of radio node 3 to radio node 4 at time T1. In the example of FIG. 7, the radio node 3 transmits on frequencies f1 and f3. Accordingly, the power spectrum density on f1 and f3 is present and high at threshold TSH1.

FIG. 8 illustrates the reception of radio node 1 from radio node 3, where radio node 3 is hidden from radio node 1, at time T1. In the example of FIG. 8, the radio node 1 receives on frequencies f1 and f3. Accordingly, the power spectrum density on f1 and f3 is present at threshold TSH2, but significantly lower than the power spectrum density on f1 and f3 from the transmission of the radio node 3 at threshold TSH1 in FIG. 7. Put simply, TSH1>TSH2.

FIG. 9 illustrates the reception of radio node 2 from radio node 3, where radio node 3 is hidden from radio node 1, at time T1. In the example of FIG. 9, the radio node 2 receives on frequencies f1 and f3. Accordingly, the power spectrum density on f1 and f3 is present at threshold TSH3, but the threshold TSH3 is lower than the power spectrum density on f1 and f3 from the transmission of the radio node 3 at the threshold TSH1 and higher than the power spectrum density on f1 and f3 from the reception by the radio node 1 at the threshold TSH2. Put simply, TSH1>TSH3>TSH2.

FIG. 10 illustrates the transmission of radio node 1 to radio node 2 at time T2. In the example of FIG. 10, the radio node 1 transmits on frequencies f2 and f4 because the node 2 PSD measurement shows f1 and f3 would have interference from node 3 which is hidden from node 1. Accordingly, the power spectrum density on f2 and f4 is present and high at threshold TSH4. Without spectrum sensing from radio node 2 (as illustrated in FIG. 9), radio node 1 would have not been able to select f2 and f4 for transmission (as illustrated in FIG. 10) because radio node 1 is not able to sense the transmission from radio node 3 (TSH2 is close to zero).

FIG. 11 illustrates the reception of radio node 2 from radio nodes 1 and 3 at time T2. In the example of FIG. 11, the radio node 2 receives on frequencies f1-f4. Accordingly, the power spectrum density on f1 and f3 is present at threshold TSH5 and the power spectrum density on f2 and f4 is present at threshold TSH6. The threshold TSH6 is slightly higher than the threshold TSH5 because radio node 1 is closer to radio node 2 than radio node 3 (assuming both the transmission at radio node 1 and transmission at radio node 3 have the same transmit PSD level). Put simply, TSH6>TSH5. Additionally, the radio node 2 is unable to transmit because frequencies f1-f4 are occupied.

FIG. 12 illustrates the reception of radio node 2 from radio node 1 at time T3. In the example of FIG. 11, the radio node 2 receives on frequencies f2 and f4. Accordingly, the power spectrum density on f2 and f4 is present at the threshold TSH6, but lower than the power spectrum density on f2 and f4 from the transmission of the radio node 1 at the threshold TSH4. Put simply, TSH4>TSH6.

FIG. 13 illustrates the transmission of radio node 2 to radio node 1 at time T3. In the example of FIG. 13, the radio node 2 transmits on frequencies f1 and f3. Accordingly, the power spectrum density on f1 and f3 is present and high at threshold TSH7.

FIG. 14 illustrates the reception of radio node 1 from radio node 2 at time T3. In the example of FIG. 14, the radio node 1 receives on frequencies f1 and f3. Accordingly, the power spectrum density on f1 and f3 is present at threshold TSH8, but lower than the power spectrum density on f1 and f3 from the transmission of the radio node 3 at the threshold TSH7. Put simply, TSH7>TSH8.

Figure 15:
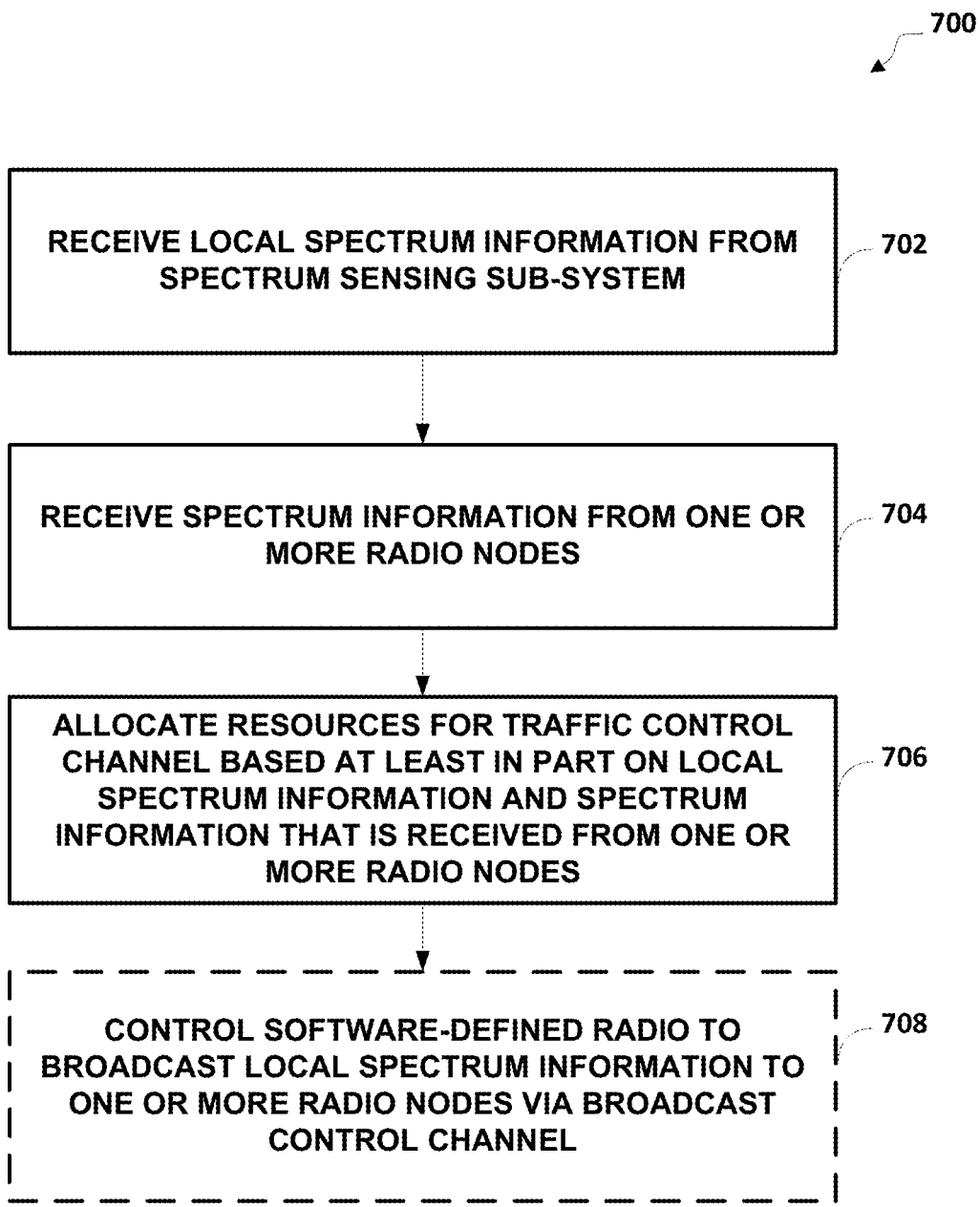
FIG. 15 is a flowchart that illustrates a dynamic spectrum sharing method.

FIG. 15 is a flowchart that illustrates a dynamic spectrum sharing method 700. The method 700 is described with respect the radio node architecture 200 of FIG. 2.

The method 700 includes receiving, with an electronic processor, local spectrum information from a spectrum sensing sub-system (at block 702). For example, the electronic processor 222 receives local spectrum information from the spectrum sensing sub-system 218.

The method 700 includes receiving, with the electronic processor, spectrum information from one or more radio nodes (at block 704). For example, the electronic processor 222 receives spectrum information from the one or more radio nodes via the broadcast control channel sub-system 212. In some embodiments, the one or more radio nodes are a plurality of radio nodes forming a wireless network. The plurality of radio nodes includes one or more radio nodes having the radio node architecture 200 of FIG. 2.

The method also includes allocating, with the electronic processor, resources for a traffic data channel based at least in part on the local spectrum information and the spectrum information that is received from the one or more radio nodes (at block 706). For example, the electronic processor 222 controls the MAC layer 210 based on the local spectrum information and the spectrum information that is received from the one or more radio nodes via the broadcast control channel sub-system 212.

Additionally, in some embodiments, the method 700 further includes controlling, with the electronic processor, a software-defined radio to broadcast the local spectrum information to the one or more radio nodes via a broadcast control channel (at optional block 708). For example, the electronic processor 222 controls the software-defined radio 202 to broadcast the local spectrum information and the control signal information for the traffic data channel if the node is sending traffic data to the one or more radio nodes via the broadcast control channel sub-system 212.

In some embodiments, allocating the resources for the traffic data channel sub-system 206 further includes generating a spectrum information composite from the local spectrum information and the spectrum information that is received from the one or more radio nodes, determining whether spectrum is available for transmission of data on the traffic data channel sub-system 206 based on the spectrum information composite, and controlling the software-defined radio 202 to transmit the data on the traffic data channel sub-system 206 using the spectrum that is available for the transmission of the data. Additionally, in these embodiments, allocating the resources for the traffic data channel sub-system 206 further includes controlling the software-defined radio 202 to not transmit the data on the traffic data channel sub-system 206 when the spectrum is not available for the transmission of the data.

Figure 16:
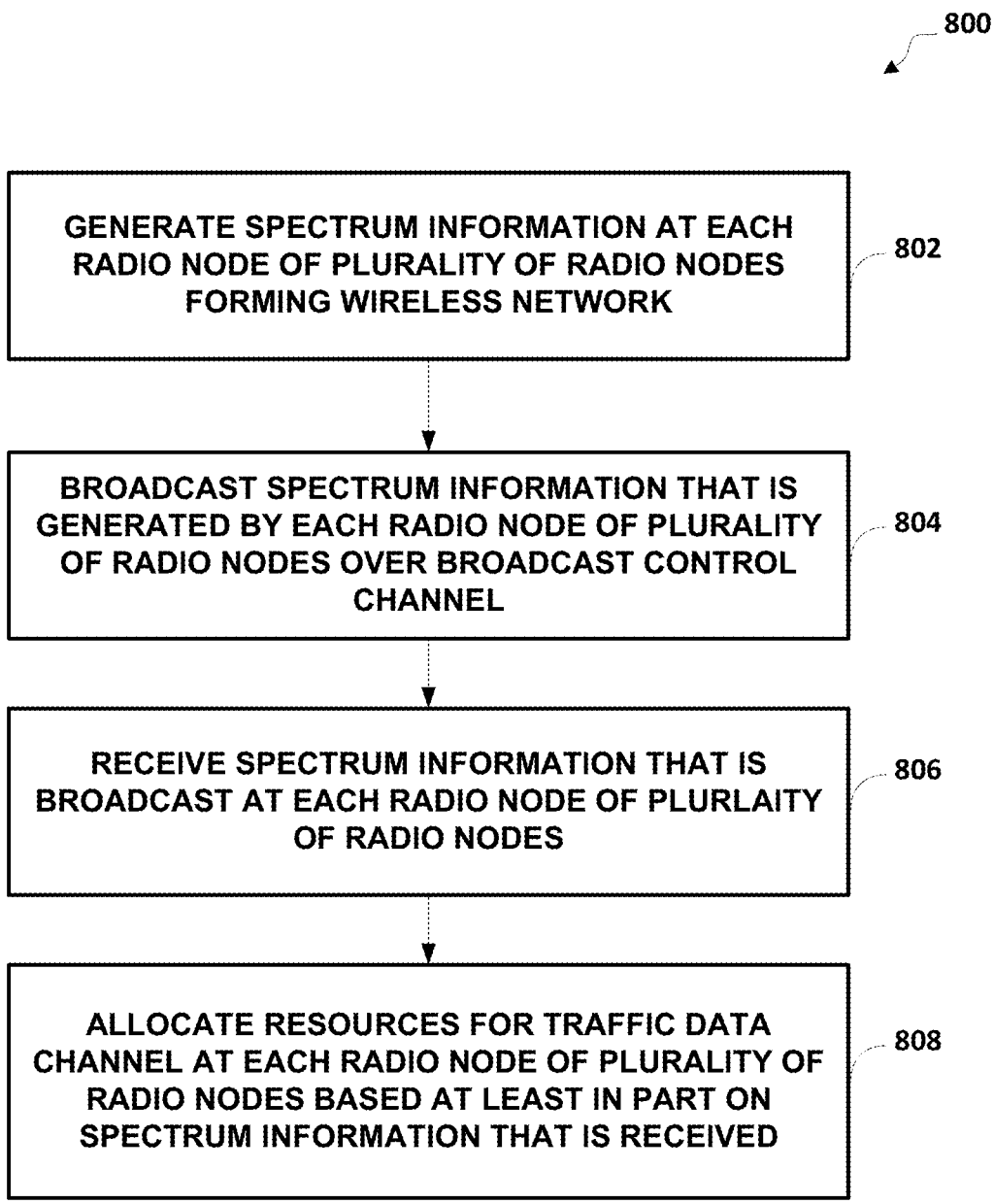
FIG. 16 is a flowchart that illustrates another dynamic spectrum sharing method.

FIG. 16 is a flowchart that illustrates another dynamic spectrum sharing method 800. For ease of understanding, the method 800 is described with respect the collaborative intelligent radio network (CIRN) 100 of FIG. 1. However, the method 800 is equally applicable to the CIRN 200 of FIG. 1, a combination of the CIRN 100 and the CIRN 200 of FIG. 1, or any other CIRNs in proximity to the CIRN 100.

The method 800 includes generating spectrum information at each radio node of a plurality of radio nodes forming a wireless network (at block 802). For example, each of radio nodes 1-5 forming a wireless network generates spectrum information using a respective spectrum sensing sub-system 218.

The method 800 includes broadcasting the spectrum information that is generated by the each radio node of the plurality of radio nodes over a broadcast control channel (at block 804). For example, each of radio nodes 1-5 broadcasts their respective spectrum information to each other over their respective broadcast control channel sub-system 212.

The method 800 includes receiving the spectrum information that is broadcast over the broadcast control channel at the each radio node of the plurality of radio nodes (ta block 806). For example, each of radio nodes 1-5 receives spectrum information from each other over their respective broadcast control channel sub-system 212.

The method 800 also includes allocating resources for a traffic data channel at the each radio node of the plurality of radio nodes based at least in part on the spectrum information that is received (at block 808). For example, each of the radio nodes 1-5 controls their respective MAC layer 210 based on the spectrum information that is received from each other over the broadcast control channel sub-system 212.

In some embodiments, allocating the resources for the traffic data channel further includes generating a spectrum information composite the spectrum information that is received, determining whether spectrum is available for transmission of data on the traffic data channel sub-system 206 based on the spectrum information composite, and controlling the software-defined radio 202 to transmit the data on the traffic data channel sub-system 206 using the spectrum that is available for the transmission of the data. Additionally, in these embodiments, allocating the resources for the traffic data channel sub-system 206 further includes controlling the software-defined radio 202 to not transmit the data on the traffic data channel sub-system 206 when the spectrum is not available for the transmission of the data.

Thus, the present disclosure provides, among other things, a wireless communication system with dynamic spectrum sharing. Various features and advantages of the present disclosure are set forth in the following claims.

What is claimed is:

1. A wireless communication device comprising:
a software-defined radio configured to
generate an input signal, and
wirelessly communicate with a plurality of radio nodes using a traffic data channel and a broadcast control channel, wherein the plurality of radio nodes form a wireless mesh network;
a spectrum sensing sub-system configured to sense local spectrum information from the input signal;
a memory; and
an electronic processor communicatively connected to the memory and the spectrum sensing sub-system, the electronic processor configured to
receive the local spectrum information from the spectrum sensing sub-system,
receive spectrum information from the plurality of radio nodes, and
allocate resources for the traffic data channel based on the local spectrum information and the spectrum information that is received from the plurality of radio nodes,
wherein, to allocate the resources for the traffic data channel, the electronic processor is further configured to
generate a spectrum information composite from the local spectrum information and the spectrum information that is received from the plurality of radio nodes,
determine whether spectrum is available for transmission of data on the traffic data channel based on the spectrum information composite,
control the software-defined radio to transmit the data on the traffic data channel using the spectrum that is available for the transmission of the data, and
generate control signal information in a transmit broadcast control channel for the data transmitted on the traffic data channel.

2. The wireless communication device of claim 1, wherein, to receive the spectrum information from the plurality of radio nodes, the electronic processor is further configured to receive the spectrum information from the plurality of radio nodes via the broadcast control channel.

3. The wireless communication device of claim 1, wherein the electronic processor is further configured to control the software-defined radio to broadcast the spectrum information from the spectrum sensing sub-system to the plurality of radio nodes via the broadcast control channel.

4. The wireless communication device of claim 1, wherein, to allocate the resources for the traffic data channel, the electronic processor is further configured to control the software-defined radio to not transmit the data on the traffic data channel when the spectrum is not available for the transmission of the data.

5. A dynamic spectrum sharing method, the method comprising:
receiving, with an electronic processor, local spectrum information from a spectrum sensing sub-system;
receiving, with the electronic processor, spectrum information from a plurality of radio nodes, wherein the plurality of radio nodes form a wireless mesh network; and
allocating, with the electronic processor, resources for a traffic data channel based at least in part on the local spectrum information and the spectrum information that is received from the plurality of radio nodes,
wherein allocating the resources for the traffic data channel further includes
generating a spectrum information composite from the local spectrum information and the spectrum information that is received from the plurality of radio nodes,
determining whether spectrum is available for transmission of data on the traffic data channel based on the spectrum information composite,
controlling a software-defined radio to transmit the data on the traffic data channel using the spectrum that is available for the transmission of the data.

6. The method of claim 5, further comprising controlling, with the electronic processor, a software-defined radio to broadcast the local spectrum information to the plurality of radio nodes via a broadcast control channel.

7. The method of claim 5, wherein receiving the spectrum information from the plurality of radio nodes further includes receiving the spectrum information from the plurality of radio nodes via a broadcast control channel.

8. The method of claim 5, wherein allocating the resources for the traffic data channel further includes controlling the software-defined radio to not transmit the data on the traffic data channel when the spectrum is not available for the transmission of the data.

9. A wireless communication system comprising:
a plurality of radio nodes forming a wireless mesh network, at least two of the plurality of radio nodes including
a software-defined radio configured to
generate an input signal, and
wirelessly communicate with one or more radio nodes of the plurality of radio nodes using a traffic data channel and a broadcast control channel;
a spectrum sensing sub-system configured to sense local spectrum information from the input signal;
a memory; and
an electronic processor communicatively connected to the memory and the spectrum sensing sub-system, the electronic processor configured to receive the local spectrum information from the spectrum sensing sub-system, receive spectrum information from the one or more radio nodes, and allocate resources for the traffic data channel based on the local spectrum information and the spectrum information that is received from the one or more radio nodes, wherein, to allocate the resources for the traffic data channel, the electronic processor is further configured to generate a spectrum information composite from the local spectrum information and the spectrum information that is received from the one or more radio nodes, determine whether spectrum is available for transmission of data on the traffic data channel based on the spectrum information composite, control the software-defined radio to transmit the data on the traffic data channel using the spectrum that is available for the transmission of the data, and generate control signal information in a transmit broadcast control channel for the data transmitted on the traffic data channel.

10. The wireless communication system of claim 9, wherein, to receive the spectrum information from the one or more radio nodes, the electronic processor is further configured to receive the spectrum information from the one or more radio nodes via the broadcast control channel.

11. The wireless communication system of claim 9, wherein the electronic processor is further configured to control the software-defined radio to broadcast the spectrum information from the spectrum sensing sub-system to the one or more radio nodes via the broadcast control channel.

12. The wireless communication system of claim 9, wherein, to allocate the resources for the traffic data channel, the electronic processor is further configured to control the software-defined radio to not transmit the data on the traffic data channel when the spectrum is not available for the transmission of the data.

13. A dynamic spectrum sharing method, the method comprising:

generating spectrum information at each radio node of a plurality of radio nodes forming a wireless mesh network;

broadcasting the spectrum information that is generated by the each radio node of the plurality of radio nodes over a broadcast control channel;

receiving the spectrum information that is broadcast over the broadcast control channel at the each radio node of the plurality of radio nodes; and allocating resources for a traffic data channel at the each radio node of the plurality of radio nodes based at least in part on the spectrum information that is received, wherein allocating the resources for the traffic data channel further includes generating a spectrum information composite from the spectrum information that is received, determining whether spectrum is available for transmission of data on the traffic data channel based on the spectrum information composite, and controlling a software-defined radio to transmit the data on the traffic data channel using the spectrum that is available for the transmission of the data.

14. The method of claim 13, wherein allocating the resources for the traffic data channel further includes controlling the software-defined radio to not transmit the data on the traffic data channel when the spectrum is not available for the transmission of the data.

* * * * *